United States Patent Office 3,303,899
Patented Feb. 14, 1967

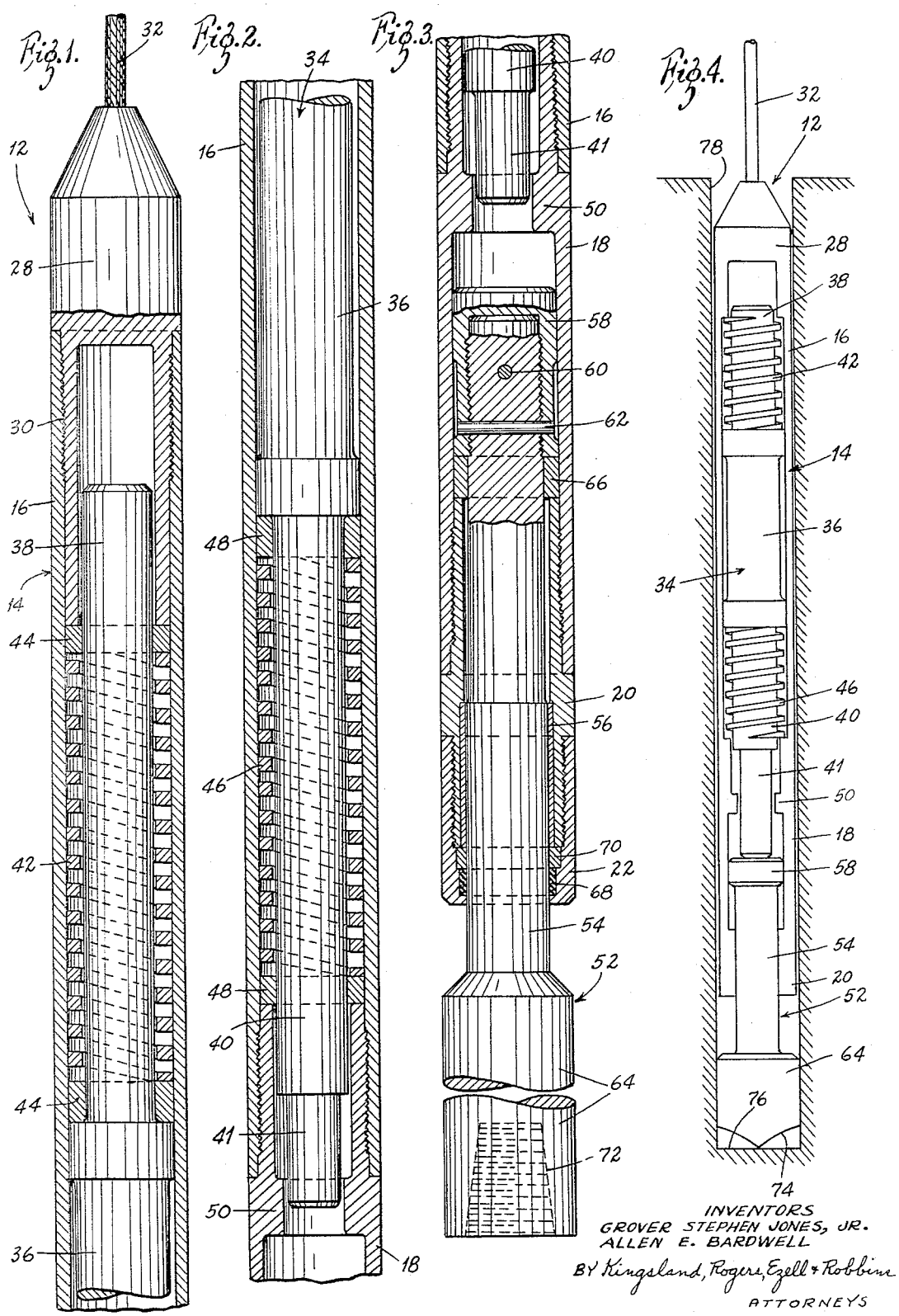

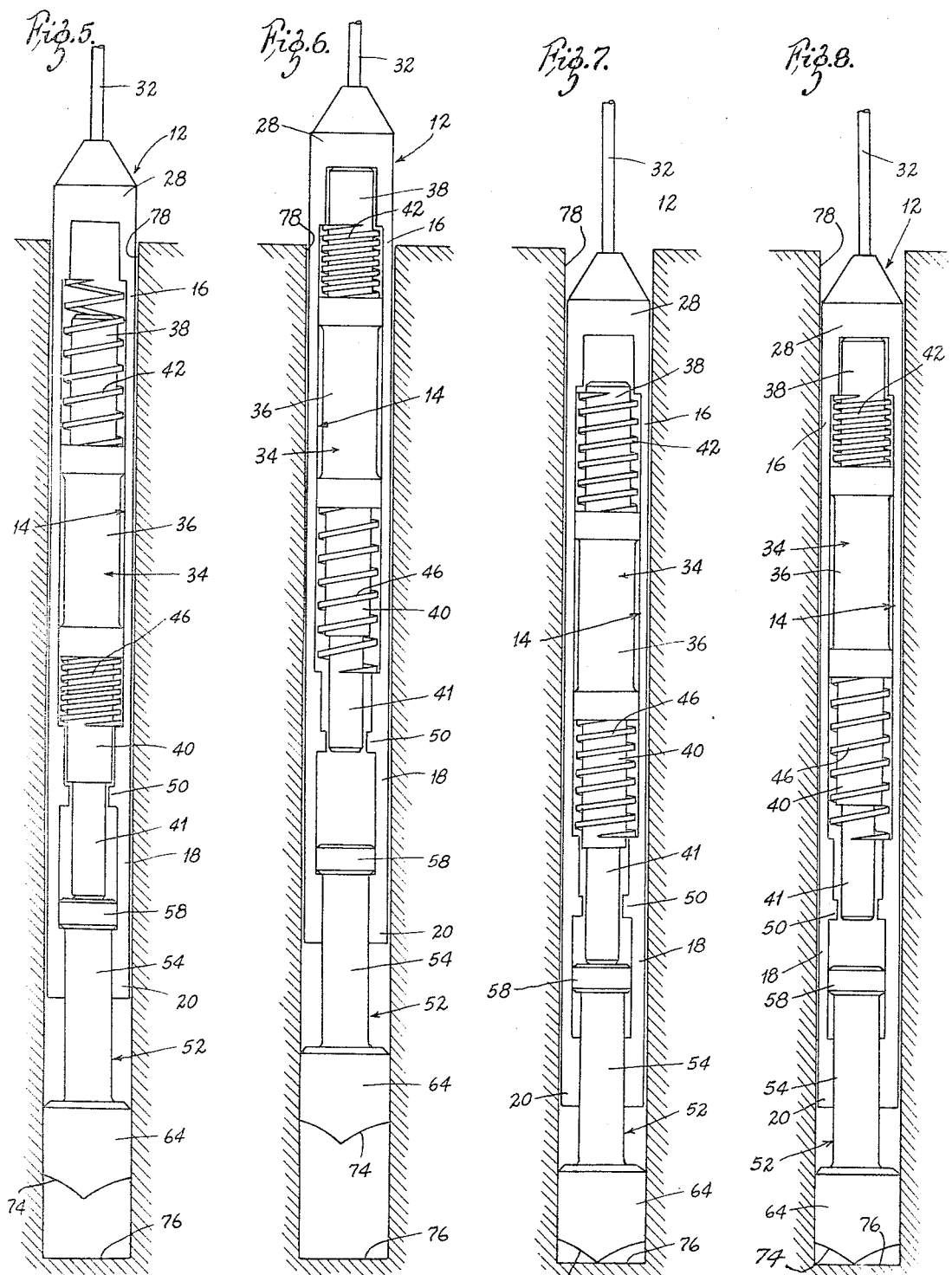

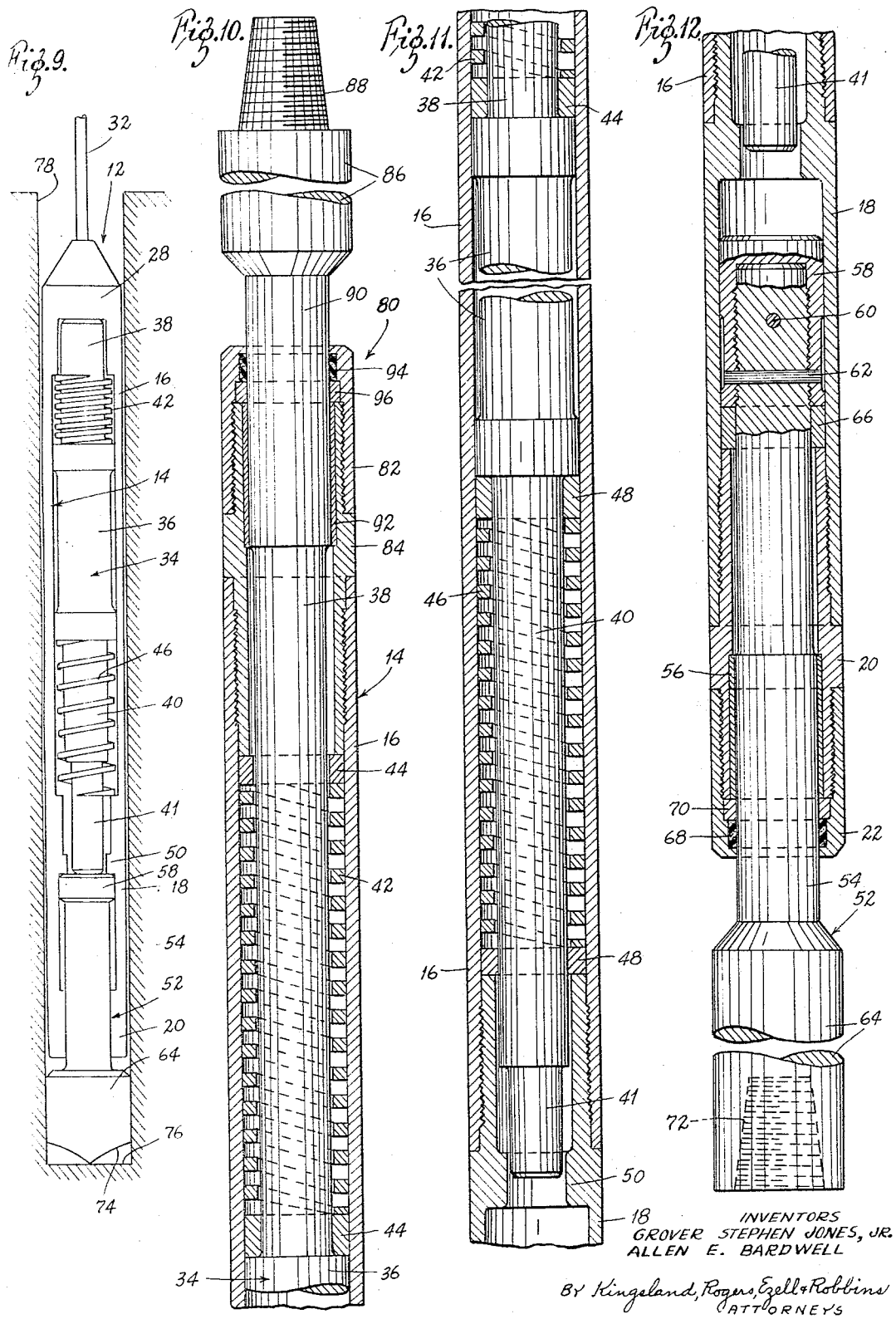

3,303,899
SYNCHRONOUS CHATTER PERCUSSION
HAMMER DRILL
Grover Stephen Jones, Jr., Timonium, Md., and Allen E. Bardwell, East Brunswick, N.J., assignors to Trident Industries, Inc., Vincentown, N.J., a corporation of Delaware
Filed Sept. 23, 1963, Ser. No. 310,622
27 Claims. (Cl. 175—299)

The present invention pertains to drilling mechanisms generally, and in particular, to an inertially energized hammer drilling device.

The instant invention concerns a mechanism capable of delivering to a cutting tool a rapid, synchronized, and sustained series of blows in combination with a more substantial follow-through impact, and thereby providing an effective drilling technique in earth boring operations. It is the fundamental contention of this patent that the invention described herein provides a new and novel method for drilling by kinetically maintaining energy created with inertial forces in a system of opposing springs and by providing a mechanism and technique whereby this energy is utilized to induce a controlled chatter of impacts against a bit assembly which, in turn, acts against the material being drilled.

The standard and traditionally used churn drill consists in a cutting tool or drill attached to a rope or steel cable, by means of which it is alternately hoisted and abruptly dropped through a specified distance. The drill, per se, is an elongated metal shaft commonly termed a shank or a sinker bar. The lower end of said shank has an enlarged section called the bit of which the lower extremity is a sharpened edge which comes into contact with the bottom of the bore. By consistently repeating the cycle of hoisting and dropping the tool, the cutting or drilling action is effected. Powered machinery is usually employed in manipulating the drill which, for some applications, may weigh in excess of a ton.

Drill adapters have been devised which utilize some of the force involved in lifting the drill for cocking a spring-loaded hammer which is released after the drill has been abruptly dropped and has collided wtih the bottom of the bore. The objective of such adapters is to supplement the drilling action of the churn drill by supplying one or several powerful impacts on the bottom of the bore subsequent to an initial gravity impact resulting from dropping the drill.

An object of the instant invention is to effect a drilling action similar to that presently developed with the far more elaborate equipment utilizing a powered air compressor and a compressed air driven hammer. That is, it is a general object of the instant invention to provide a device adapted for use with standard churn drilling equipment which is capable of delivering a rapid, synchronized, and sustained series of relatively light impacts to a bit assembly.

In exterior appearance, the instant invention resembles a standard churn drilling shank with the exception of a movable bit assembly which is used on most models. It may be approximately the same size, shape, and weight as a standard churn drill and is likewise hung from a cable. A motor driven winch is also provided for manipulating the instant invention, and it is activated by consistently repeating the cycle of hoisting and dropping. Unlike the churn drill or any previously devised spring-loaded hammer adapter for a churn drill, the instant invention utilizes the inertial force inherent in its upward acceleration during the hoisting operation to excite a spring-suspended hammer to a state of rapid oscillation. This energy of oscillation energy maintained in kinetic form is subsequently released to impart a chatter of controlled impacts on a movable bit assembly.

Hence, another object of the instant invention is to provide a drill of greatly increased drilling speed and efficiency over any currently employed or previously devised equipment of comparable cost.

Another object of the invention is to provide a relatively simple drill capable of a drilling action comparable to or superior to that action produced with the more elaborate currently used equipment activated by a powered air compressor. That is, the instant invention is intended to provide a drill with a spring-driven hammer which is synchronized to impart a controlled rapid and continued sequence of blows upon a movable or fixed bit assembly during that portion of the drilling cycle in which said bit assembly is in contact with the surface to be drilled.

Another object of the instant invention is to utilize inertial force to excite a spring-mounted hammer to a state of rapid oscillation and, in turn, impinging a movable bit assembly to effect the controlled release of this energy of oscillation at the most advantageous moment during the drilling cycle to produce the action described in the previous paragraph.

In the employment of standard churn drilling equipment against hard rock formations, the shank assembly tends to bounce violently upon impact with the bottom of the bore. Another object of the instance invention is to employ a properly synchronized spring assembly to redirect the energy normally dissipated in this bouncing action to impart additional impacts to a bit assembly and thereby further increase drilling efficiency.

It is also an object of the instant invention to provide a drill for which the only exterior relative motion is between the bit assembly and the remainder of the tool. The fact that the motion acting as the principal drilling agent takes place within the protecting walls of a casing minimizes the loss of efficiency when drilling through water and mud.

It is also an object of the instant invention to provide a drill which is capable of highly effective work without resorting to the severe impacts and long hoisting and dropping cycles, characteristic of previously devised churn drills with spring-driven hammer adapters, which tend to fatigue, damage, and shorten the functional life of the drill and supporting equipment.

It is also an object of the instant invention to provide a drill which, by replacing the severe impacts of previously devised churn drilling adapters by a rapid series of relatively light impacts, is capable of effectively employing carbide cutting surfaces on hard rock without frequent fractures.

Another object of the instant invention is to provide a drill with a hammer assembly which has no direct connection with the supporting cable, and, therefore, cannot induce excessive tension on said cable.

Another object of the invention is to provide a drill capable of drilling bores of larger and smaller diameter in hard rock than is currently practical with churn drilling equipment by utilizing a more concentrated drilling force.

Another aim of the invention is to provide a drilling action which will result in a straighter and more uniform bore than is normally possible with churn drilling equipment.

Still another purpose of the invention is to provide a device capable of carrying out the foregoing objectives and is furthermore adaptable for use with currently employed churn drilling equipment.

Other objects and advantages will become apparent as the description proceeds, and a more comprehensive understanding of the invention will be forthcoming from the following discussion considered in conjunction with the accompanying drawings, in which:

FIGURES 1, 2 and 3 comprise a longitudinal, diametric cross-sectional view through a synchronous chatter percussion hammer drill incorporating the teachings of the present invention, it being understood that FIGURE 1 includes the upper portion of the drill, FIGURE 2 the central portion of the drill, and FIGURE 3 the lower portion of the drill;

FIGURE 4 is a diagrammatic or functional view of said drill illustrating the relative positions of the parts with the drill resting on the bottom of a bore;

FIGURE 5 is a diagrammatic or functional view of the instant drill, illustrating the relative positions of the several parts of the drill as a lifting force is applied to the cables;

FIGURE 6 is a diagrammatic or functional view of the instant drill, illustrating the relative positions of the several parts upon abrupt reduction in the upward acceleration as the drill approaches the top position of the drilling cycle;

FIGURE 7 is a diagrammatic or functional view of the instant drill, illustrating the relative positions of the several parts at the instant of impact of the hammer with the handle impact cap;

FIGURE 8 is a diagrammatic or functional view of the instant drill, illustrating the relative positions of the several parts when the hammer is in its upper position ready to be accelerated downward by the upper spring for collision with the anvil impact cap;

FIGURE 9 is a diagrammatic or functional view of the instant drill, illustrating the relative positions of the several parts at the casing follow-through phase of the drilling cycle and;

FIGURE 10–12 are views similar to FIGURES 1–3 of a modified drill.

Referring to the drawings more particularly by reference numerals, 12 indicates generally a synchronous chatter percussion hammer drill incorporating the principles of the present invention. The drill 12 is of elongated construction, requiring fragmentary views for full illustration (FIGS. 1–3).

The drill 12 includes an elongated multi-segment cylindrical tubular casing assembly 14 comprising a main long upper segment 16, an intermediate segment 18, a sleeve segment 20, and a lower segment 22, said segments 16, 18, 20 and 22 being threadedly connected together, as is clear from the drawings. An annular casing cap 28 of the configuration shown in FIGURE 1 is mounted in the upper casing segment 16 by threads 30 and extends therefrom. A supporting cable 32 is secured to the upper end of the casing cap 28 for lifting the drill 12.

Reciprocally mounted within the casing assembly 14 is a massive hammer unit 34 which includes a central principal hammer body portion 36, an upper reduced shaft portion 38, a lower reduced shaft portion 40, and an impact head 41 which is further reduced in diameter and of tough hardened steel. The central hammer body portion 36 provides most of the mass for the generation of momentum utilized in impacts against an anvil assembly described below, and it may be in excess of eight feet long and weigh several hundred pounds. This mass is essential for creating the inertial force for activating springs and thereby ultimately being used to produce a rapid succession of impacts against an anvil assembly.

Surrounding the upper hammer shaft portion 38 is a heavy compression spring 42 which engages spring adjustment rings 44 at its upper and lower ends, the upper ring 44 engaging the lower edge of the casing cap 28 and the lower ring 44 abutting a shoulder of an enlarged portion of the upper end of the central hammer body portion 36 (FIG. 1). The width of the rings 44 determine the specific adjustment of the compression of the spring 42 and the neutral position of the hammer unit 34 in relation to the casing 14. For this purpose, of course, rings 44 of selected widths will be employed.

Surrounding the lower hammer shaft portion 40 is a heavy compression spring 46 similar to the spring 42 which engages spring adjustment rings 48 at its upper and lower ends, the upper ring 48 abutting the lower shoulder of an enlarged portion of the lower end of the central hammer body portion 36 and the lower ring 48 engaging the upper end of the casing segment 18. The spring adjustment rings 48 are similar to the rings 44 and are used similarly for adjustment of the spring 46 to effect proper synchronization and positioning of the hammer.

The casing segment 18 includes an integral thickened ring portion 50 through which the impact head 41 of the hammer unit 34 reciprocates.

An anvil assembly 52 is reciprocably mounted in the casing segments 18, 20 and 22, as is clear from FIGURE 3. The anvil assembly 52 includes a main shaft portion 54, which moves up and down in a sleeve bearing 56, an impact cap 58 which is threaded to the upper end of the main shaft 54 and, in addition, pinned thereto by pins 60 and 62, and a lower shank portion 64 of sufficient mass to prevent the anvil assembly 52 from rising in the casing 14 when the drill 12 is falling through water or mud. The impact cap 58 is of tough and hardened steel, since it receives both the impacts of the hammer unit 34 and the casing follow through. The impact cap 58 also retains the anvil assembly 52 within the casing 14 as the drill 12 is hoisted, the lower edge thereof engaging in its lower position a bumper ring 66 of shock-absorbing material, such as nylon, the primary purpose thereof being to cushion the impact against the casing unit 14 by the impact cap 58 when the drill 12 is abruptly hoisted. The bumper ring 66 also serves as a bearing for the upper end of the shaft portion 54. The bumper ring 66 is supported against the upper end of the casing segment 20 (FIG. 3).

Annular seals 68 surround the anvil shaft 54 and are disposed in the bottom of the casing segment 22, the seals 68 providing protection from water, dirt and particles of rock which are almost invariably present in the bore. A ring 70 maintains the seals 68 firmly in operative positions. One or a plurality of seals 68 may be employed, as desired.

The anvil shank 64 includes a threaded bit socket 72 which removably receives a bit of selected design.

Operation

FIGURES 4 through 9 are diagrammatic or functional drawings of the instant invention at various phases of its drilling cycle. The operation of the drill 12 begins with the assembly supported in a vertical position with the cutting edge of the bit 74 in contact with the surface 76 of the material to be drilled. FIGURE 4 pictures the relative positions of the various component parts of the drill 22 sitting at rest on the bottom of the bore 78. The drill is supported by means of the cable 32 passing over a pulley located at the top of a derrick (not shown), as is standard for churn drilling equipment. That portion of the cable 32 which is not extended is wound on a powered winch, or otherwise stored on the opposite side of the pulley from the drill 12. By means of a powered machine, a pulling force may be applied to the cable 32, and it is this force which is utilized in lifting and accelerating the drill 12 upward.

When a lifting force is applied to the cable 32 in accelerating the drill 12 upward, the component parts of the drill 12 move to the relative positions indicated in FIGURE 5 in response to the inertial forces inherent in this act. That is, the anvil assembly 52 moves to its lowest position, the lower spring 46 compresses, and the upper spring 42 is allowed to expand. For a fixed acceleration upward, it is clear that the amount of spring compression possible is in direct proportion to the mass of the hammer assembly or unit 34. When the upward acceleration is abruptly reduced, as the drill 12 approaches the top position of its drilling cycle, the lower spring 46 expands and the upper spring 42 is compressed as indicated in FIGURE 6. That is, a transfer of potential energy from the lower spring 46 to the upper spring 42 has been effected. On its return fall to the bottom of the bore, the hammer unit 34 oscillates rapidly between the extreme positions indicated in FIGURES 5 and 6. As the drill 12 approaches the bottom of the bore 78, the anvil assembly 52 makes contact first and moves upward relative to the remainder of the drill 12. This, of course, implies that the gap between the anvil impact cap 58 and the bottom of the ring portion 50 begins to close and the anvil impact cap 58 moves into the path of the oscillating hammer impact head 41. The effect is a rapid series of impacts on the anvil impact cap 58 by the hammer unit or assembly 34 which results in an effective cutting action for the bit 74 against the material being drilled. FIGURES 7 and 8 depict the relative positions of the component parts of the drill 12 during this impact phase of its drilling cycle. FIGURE 8 shows the hammer unit 34 in its upper position ready to be accelerated downward by the upper spring 42 and collide with the anvil impact cap 58. FIGURE 7 shows the position of the hammer unit 34 at the instant of impact with the anvil impact cap 58.

When the closing of the gap between the anvil impact cap 58 and the bottom of the ring portion 50 is completed, the drill is in that phase of its drilling cycle termed the casing follow-through phase. This phase of the cycle is important to the effective operation of the drill 12 for two distinct reasons. First of all, since the momentum of the falling casing assembly 14 is of considerable magnitude, its impact with the anvil impact cap 58 transfers considerable energy to the anvil assembly 52 and bit 74 and thereby contributes considerably to the drilling action. Secondly, the casing follow-through impact provides a means for communicating information necessary to the driller in performing his function of keeping the drill 12 properly positioned in the bore 78 deep underground. That is, the shock wave traveling up the cable 32 as a result of this impact enables the driller to maintain proper positioning of the drill 12 by "feel" much in the same manner as is currently done with standard churn drilling equipment. The relative positioning of the component parts of the drill 12 at the casing follow-through phase of the drilling cycle is shown in FIGURE 9.

The hammer assembly 34 still retains energy and delivers impacts to the anvil impact cap 58 subsequent to the casing follow-through phase and prior to the next hoisting of the anvil assembly 52 from the bottom of the bore 78. This final series of impacts, delivered during a single drilling cycle, also contributes significantly to the drilling action. When the anvil assembly 52 is subsequently lifted from the bottom of the bore 78, the cycle is completed and begun anew. By the rapid repetition of this cycle, an intermittent chattering of impacts is delivered to the anvil assembly 52, and the result is a method of drilling which uniformly and substantially improves the speed and efficiency of cable drilling and which is particularly effective in hard rock drilling.

Features are also incorporated in the invention for altering the drilling action for the purpose of optimizing its effectiveness against different types of earth strata. Different synchronization of the chattering action may be effected by varying the length of the spring adjustment rings 44 and 48 and the anvil cap bumper ring 66. Varying intensity for the casing follow-through impact may be effected by increasing or decreasing the length, and thus the weight, of the shank of the casing cap 28.

An alternate embodiment of the instant invention is illustrated in FIGURES 10-12, the same reference numerals heretofore employed being used to designate assemblies, parts and portions which are the same as those incorporated in drill 12. The alternate drill is designated generally by the reference numeral 80. The drill 80, like the drill 12, is of elongated construction and includes an elongated multi-segment cylindrical tubular casing assembly 14 comprising an upper short segment 82, an upper sleeve segment 84, a main long upper segment 16 like the upper segment 16 of the drill 12, except a little shorter for comparable drills, as is clear from FIGURES 1 and 10, an intermediate segment 18, a lower sleeve segment 20, and a lower segment 22, said segments 82, 84, 16, 18, 20 and 22 being threadedly connected together.

Reciprocally mounted within the casing assembly 14 is a massive hammer unit 34 which includes an upper shank portion 86 disposed above the upper end of the casing segment 82 and which receives an upper shank pin 88, a reduced mounting or bearing portion 90, a further reduced upper shaft portion 38, a central principal hammer body portion 36, a lower reduced shaft portion 40, and a further reduced impact head 41. The shank portion 86 may weigh several hundred pounds and this weight plays a functional part in the proper operation and synchronization of the drill 80.

A bearing sleeve 92 is mounted within the sleeve segment 84 which guides the reduced portion 90 and prevents lateral movement thereof. Upper seals 94 are provided which prohibit the entry of water, dirt and particles of rock. An upper seal support ring 96 maintains the seals 94 firmly in operative relation.

It will be noted that the upper shank pin 88 engages with a socket provided by the usual table spindle assembly, thereby effecting direct attachment of the hammer assembly 34 with the supporting cable by means of which the drill 80 is raised.

*Operation of the drill 80*

In the drill 80 of FIGURES 10-12, the hammer assembly 34 is attached directly to a cable and the casing assembly 14 is spring suspended. In this design, the upper spring 42 is compressed in response to the upward acceleration of the drill 80 during the hoisting operation. During the falling portion of the drilling cycle, the casing assembly 14 is the principal oscillating body, but there is an interacting oscillation of both the hammer assembly 34 and the casing assembly 14, which can properly be termed a surging action. As the drill 80 approaches the bottom of the bore 78, the anvil assembly 52, as before, makes contact first and moves upward relative to the remainder of the drill 80. During this phase of the operation, the anvil impact cap 58 receives a series of impacts through the bottom of the thick ring 50 and through the hammer impact head 41 as well. It is the hammer assembly 34 which delivers the follow-through impact which signals the driller and enables him to control the operation of the drill. It is clear that the principles involved in the operation of this alternate embodiment of the invention are the same as those of the initially described drill 12 with the functions of the hammer assembly 34 and the casing assembly 14 essentially interchanged.

In general, it has been determined that for a string of tools supporting a six inch diameter bit, the weight of the spring suspended hammer unit 34 or the spring suspended casing 14 in drill 80 should be several hundred pounds. For drills designed to support larger bits, this weight should be proportionately greater and may reach several thousand pounds. The force required to simultaneously compress both springs should be from two to ten times the weight of the hammer depending on the nature of the oscillation most efficient against a particular material being drilled. For example, a good all-purpose drill designed to support a six inch diameter bit may be constructed with a 300 pound hammer and a pair of springs (not necessarily of equal strength) requiring a force of 2000 pounds per inch to compress in combination.

Further, the positioning of the hammer unit should be such that when at rest in a vertical position with the anvil assembly in its lower position, the hammer unit is supported so that its lower extremity is a small fraction of an inch (less than ¼ inch) below the lower surface of the ring portion 50.

It is apparent that there have been provided drill constructions which fulfill the objects and advantages sought therefor.

It is to be understood that the foregoing descriptions and the accompanying drawings have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. In combination, a hammer drill comprising an elongated casing adapted to be raised and dropped in a drilling cycle, a hammer unit reciprocally mounted in operative relation with said casing, an anvil unit reciprocally mounted in operative relation with said casing, and spring means mounted in said casing in operative relation to said hammer unit which develops reciprocation thereof upon a raising and lowering of said casing, said hammer unit making striking engagement with said anvil unit following contact of the drill with a hole bottom and continued downward movement of hammer and casing in respect to said anvil unit.

2. In combination, a hammer drill comprising an elongated casing adapted to be raised and dropped in a drilling cycle, a hammer unit reciprocally mounted in operative relation with said casing, an anvil unit reciprocally mounted in operative relation with said casing for striking engagement by said hammer unit, a first compression spring in said casing supporting said hammer unit, and a second compression spring in said casing above said first spring pushing downward against said hammer unit, said springs developing reciprocation of said hammer unit upon a raising and dropping of said casing, which reciprocation delivers blows to said anvil unit.

3. In combination, a hammer drill comprising an elongated casing, a hammer unit mounted in operative relation with said casing for axial reciprocative movement, an anvil unit mounted in operative relation with said casing for axial reciprocative movement, said hammer unit and said anvil unit being mounted in relation to each other so that the former strikes the latter upon dropping of said drill on a surface to be drilled, and means acting upon said hammer unit energized by raising and dropping of said drill for effecting a reciprocation of the hammer unit during the dropping of the drill to deliver a series of blows of the hammer unit on the anvil unit immediately following the said drop blow.

4. The combination of claim 3 in which said means acting on said hammer unit comprises spaced springs which oscillate said hammer unit axially to repeatedly strike said anvil unit to increase drilling efficiency.

5. The combination of claim 4 in which said hammer unit is supported on one of said compression springs within said casing and said drill is lifted through said casing.

6. The combination of claim 4 in which said hammer unit extends in part upwardly from said casing and said casing is supported on said hammer unit, and said drill is lifted through said hammer unit.

7. The combination of claim 4 in which said casing has an abutment to deliver a follow-through blow to said anvil unit to increase drilling efficiency and to signal the drill operator by sending a shock wave up the drop cable.

8. The combination of claim 4 in which said springs are compression springs.

9. The combination of claim 8 including means for adjusting the effectiveness of said springs.

10. In a drill the combination of a casing, a massive hammer unit reciprocal in said casing, an anvil unit reciprocal in said casing, and spring means suspending said massive hammer unit a spaced distance above said anvil unit, said spring means being adapted to store energy upon a raising and lowering motion of said casing and to deliver it to said anvil unit through said hammer unit in the operation of said drill.

11. The combination of claim 10 in which said spring means includes at least two compression springs oppositely acting on said hammer unit.

12. In combination, a hammer drill comprising an elongated casing, a hammer unit reciprocally mounted in operative relation with said casing, an anvil unit reciprocally mounted in operative relation with said casing, a first compression spring in said casing and supporting said hammer unit and influencing reciprocation thereof, and a second compression spring in said casing above said first spring and influencing reciprocation of said hammer unit, said hammer unit having such a mass and, said first and second compression springs requiring such forces for displacement from their equilibrium positions to thereby be capable when set in a state of motion by raising and lowering said casing to sustain said hammer unit in a state of rapid oscillation, said hammer unit delivering impacts to said anvil unit during that portion of the drilling cycle when the latter is in contact with the surface to be drilled.

13. In combination, a hammer drill comprising an elongated casing, a hammer unit mounted in operative relation with said casing for axial reciprocative movement, an anvil unit mounted in operative relation with said casing for axial reciprocative movement, said hammer unit and said anvil unit being mounted in relation to each other so that the former strikes the latter when, subsequent to the dropping of said drill, the latter is in contact with the surface to be drilled, and means acting upon said hammer unit energized by the accelerations upward and the dropping of said drill for effecting a series of blows of the hammer on the anvil unit during that portion of the drilling cycle when said anvil unit is in contact with the surface to be drilled.

14. The combination of claim 13 in which said means acting on said hammer unit comprises spaced springs which oscillate said hammer unit axially to repeatedly strike said anvil unit during that portion of the drilling cycle when the latter is in contact with the surface to be drilled and thereby increasing drilling efficiency.

15. The combination of claim 14 in which said casing weighing several hundred pounds has an abutment in the path of travel of said anvil unit adapted to deliver a follow-through blow to said anvil unit to increase drilling efficiency and to signal the drill operator by sending a shock wave up a drop cable.

16. The combination of claim 14 in which said springs are opposing compression springs requiring several hundred pounds of force for each inch of displacement from equilibrium.

17. The combination of claim 16 including means for adjusting compression on said springs and for adjusting the relative positionings of said hammer, casing, and anvil units and thereby influencing the effectiveness of said drill in performing its function.

18. The combination of claim 14 in which said hammer unit is supported on one or more compression springs within said casing and said drill is lifted through said casing.

19. The combination of claim 18 in which said hammer unit is supported on one or more compression springs within said casing and said springs compress under the influence of the inertial force generated by the mass of said hammer when the drill is accelerated upward during the hoisting portion of the drilling cycle and thereby capturing energy utilized in putting said hammer in a state of rapid oscillation.

20. The combination of claim 14 in which said hammer unit extends in part upward from said casing and said casing is supported on said hammer unit, and said drill is lifted through said hammer unit.

21. The combination of claim 20 in which said casing and anvil units are supported on one or more compression springs within said casing and said springs compress under the influence of the inertial force generated by the mass of said casing and anvil unit when the drill is accelerated upward during the hoisting portion of the drilling cycle and thereby capturing energy utilized in putting said casing in a state of rapid oscillation.

22. In a percussion drill the combination comprising an elongated casing element, a hammer element associated with said casing element, one of said elements being reciprocally movable with respect to the other in a longitudinal direction, and said other element having a connection for attachment to a drilling cable, spring means interposed between said elements that, when in equilibrium, suspend the reciprocal element from the other element, whereby a raising and lowering of the element having attachment for a drilling cable actuates said spring means, in conjunction with the inertia of said reciprocal element, to place said spring means and said reciprocal element in oscillation, and an anvil unit associated with said casing element that is struck by the reciprocating element upon dropping the drill against a hole bottom.

23. A drill as in claim 22, wherein said spring means comprises a first spring supporting the reciprocal element with an upward force, and a second spring bearing downward against said reciprocal element.

24. A drill as in claim 23, wherein said anvil unit is reciprocally mounted with respect to said casing element.

25. In a percussion drill the combination comprising an elongated member having a hollow interior portion and an abutment for delivering a blow, an anvil slidably mounted in said interior portion with a portion depending beneath the casing that mounts a drill bit, said anvil having an anvil head within the said interior portion to receive a blow from the elongated member, and said anvil head normally being disposed a spaced distance beneath said abutment whereby a dropping motion of the drill that brings a drill bit in said anvil into engagement with a hole bottom arrests downward travel of the anvil and is followed by a blow of the elongated member through said abutment upon said anvil head.

26. In combination, a hammer drill of the drop type comprising an elongated casing, a hammer unit reciprocally mounted in operative relation with said casing, an anvil unit reciprocally mounted in operative relation with said casing and hammer unit, said anvil unit including a striking bit attached thereto for movement therewith, and spring means mounted in said casing in operative relation to said hammer unit and said casing, said springs being energized by raising and lowering of said drill to influence oscillation of one of said hammer unit and casing into multiple striking engagement with said anvil unit immediately following engagement of the bit with material being drilled.

27. The combination of claim 26 in which the other of said hammer unit and casing is adapted to strike said anvil a follow-through blow to substantially conclude the effective drilling sequence.

References Cited by the Examiner

UNITED STATES PATENTS

| | | | |
|---|---|---|---|
| 1,798,082 | 3/1931 | Grutzbach | 173—119 |
| 2,371,248 | 3/1945 | McNamara | 175—299 X |
| 2,665,115 | 1/1954 | Bassinger | 175—299 X |
| 2,713,992 | 7/1955 | Snyder | 175—56 |
| 2,738,956 | 3/1956 | Bielstein | 175—56 X |
| 2,742,263 | 4/1956 | Clugage | 175—56 |
| 2,835,474 | 5/1958 | O'Connor et al. | 175—299 |
| 2,872,158 | 2/1959 | Green | 175—299 |
| 3,215,212 | 11/1965 | Bardwell | 175—299 |

CHARLES E. O'CONNELL, *Primary Examiner.*

R. E. FAVREAU, *Assistant Examiner.*